3,516,429
**SYSTEM FOR AUTOMATIC CONTROL OF
GAS PRESSURE**
Gerd Sandstede and Erich Maria Robens, Frankfurt am Main, Germany, assignors to Sartorius Werke, G.m.b.H. (und vormals Gottinger Prazisionswaagenfabrik, GmbH), Gottingen, Germany, a corporation of Germany
Filed Apr. 11, 1968, Ser. No. 720,735
Claims priority, application Germany, Apr. 12, 1967, S 109,298
Int. Cl. G05d 16/20
U.S. Cl. 137—87                                7 Claims

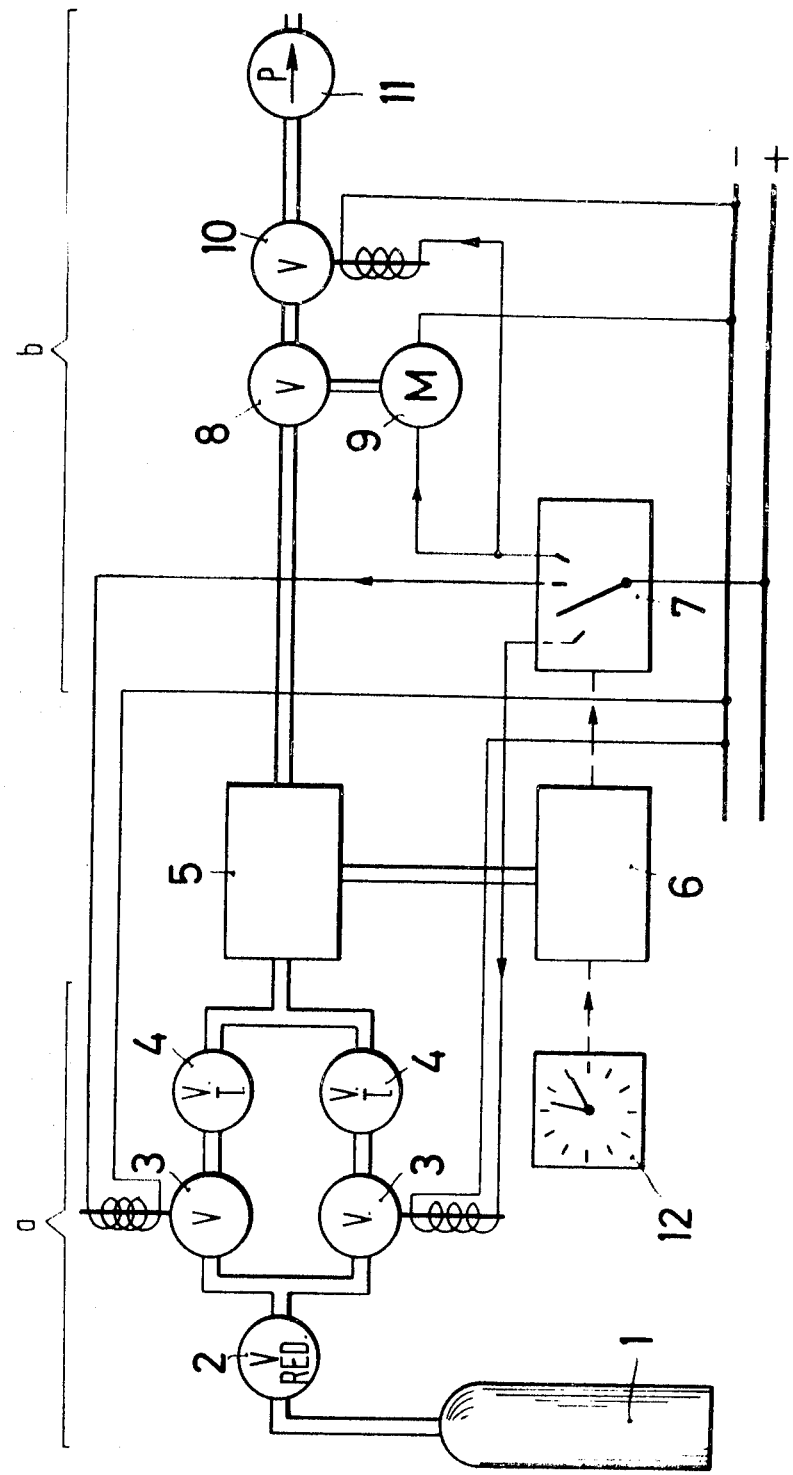

ABSTRACT OF THE DISCLOSURE

A receiver is connected by an inlet section to a source of gas under high pressure and by an outlet section to a gas-withdrawing means. One of said sections comprises a solenoid valve and in series therewith a throttle valve. The other of said sections comprises a solenoid valve and in series therewith a variable-area throttle valve. A motor is provided, which is energizable to adjust the area of said variable-area throttle valve. A measuring means is arranged to produce an electric output signal in response to the gas pressure in said receiver. An electric controller is connected to said measuring means and arranged to control the energization of said solenoids and said motor in response to said output signal.

---

This invention relates to a system for an automatic control of a gas pressure, specifically for maintaining a constant gas pressure and for effecting programmed changes thereof, particularly in receivers having a small volume and within a large pressure range.

Systems for an automatic control of gas pressure are already known (see Angerer and Ebert, "Technische Kunstgriffe bei physikalischen Untersuchungen," 13th edition, 1964, pp. 230–235, and Ullmann, "Encyclopädie der Technischen Chemie," vol. 2/1, 1961, pp. 851–852).

In the known automatic control systems, the control of pressure is effected continuously, semicontinuously or discontinuously.

In a continuous automatic control system, the reaction gas drawn from the reservoir is coarsely adjusted by a pressure-reducing valve to a supply pressure and then flows through a fixedly adjusted throttle valve continuously into the receiver, from which it is continuously drawn by a pump through a motor-operated control valve. This valve is controlled by a controller in response to a measuring means in such a manner that the desired pressure is maintained in the receiver.

In a discontinuous automatic control system, the reservoir is provided with a pressure-reducing valve and a solenoid valve is connected between the reservoir and the fixedly adjusted throttle valve. Said solenoid valve is controlled by a controller in response to a measuring means in such a manner that the solenoid valve is opened as soon as the pressure in the receiver is too low. This automatic control system can be used only where a spontaneous pressure rise in the receiver, e.g., as a result of overheating or an evolution of gas, cannot occur.

A system operates semicontinuously if the reaction gas flows from the reservoir through a pressure-reducing valve for a coarse adjustment of the supply pressure and a fixedly adjusted throttle valve continuously into the receiver, and a non-intended pressure rise in the receiver causes gas to be drawn from the receiver by a pump through a throttle valve and a succeeding solenoid valve, which is controlled by a controller in response to a measuring means, until the desired pressure is reached.

Where solenoid valves are used, a fine automatic control can be accomplished in that a plurality of solenoid valves and associated throttle valves are connected in parallel and the throttle valves are adjusted to different areas so that small pressure differentials can be compensated with the aid of the smallest-area throttle valve and the associated solenoid valve.

In these known systems for an automatic control of a gas pressure it is not always possible to maintain the pressure in the receiver at an exactly adjusted constant value unless an unreasonably large amount of reaction gas is consumed.

It is an object of the invention to provide for an automatic control of a gas pressure a system whereby the gas pressure is constantly maintained at an exactly adjusted value with high precision.

It is a further object of the invention to provide for an automatic control of a gas pressure a system which consumes only very small amounts of reaction gas.

It has been found that these objects can be accomplished in that the inlet section comprises a solenoid valve, which is connected in series with a throttle valve or needle valve between the pressure-reducing valve and the receiver, and the outlet section comprises a solenoid valve connected in series with a motor-operated control valve (servo valve) between the receiver and the vacuum pump, the solenoid valves being controlled in known manner by the controller in response to the measuring means.

The system according to the invention for an automatic control of a gas pressure is diagrammatically shown on the accompanying drawing.

Compressed gas flows from a gas reservoir 1 through a pressure-reducing valve 2 and two parallel-connected solenoid valves 3 and respective associated throttle valves 4 adjusted to different areas into a receiver 5. The pressure-reducing valve 2 reduces the pressure of the gas drawn from the high pressure gas reservoir 1 to a value which is between the highest pressure which may be desired in the receiver and twice that highest pressure. The solenoid valves 3 associated with the throttle valves or needle valves 4 are operated by a controller 7 in response to a measuring means consisting of a pressure gage 6 in such a manner that the pressure in the receiver 5 reaches the prescribed value. If this value is exceeded, e.g., as a result of an unintended heating or evolution of gas, a vacuum pump 11 provided in the outlet section $b$ of the system is operated. This pump is preceded by a motor-operated control valve 8 in series with a solenoid valve 10. The servomotor 9 and the solenoid valve 10 are controlled by the controller 7 in response to the measuring means 6.

The volumetric rate of flow of gas through the inlet section $a$ or the outlet section $b$ is proportional to the pressure differential across the throttle valves. To ensure a uniform, high sensitivity of the automatic control throughout the pressure range, the throttled flow area must be varied in response to a large change of the pressure differential. This control is effected by the electric controller in response to the measuring means, which consists of a continuously indicating pressure gage 6.

The measuring means may consist of any pressure gage which gives a continuous indication and has an electrical output, e.g., a mercury pressure gage incorporating a drawn-in resistance wire and provided with a source of current, a diaphragm-type or bourdon-spring pressure gage or a lift-type pressure gage. Where each of the inlet and outlet sections comprises only one solenoid valve and one servo-controlled needle valve, the measuring means may consist of a mercury contact pressure gage. In this case, an additional electric controller is not required, provided that the opening and closing of the valves is delayed.

The desire pressure is electrically adjusted by a compensator, which applies an opposing voltage for moving the pointer of the measuring system of the controller to a central position when the desired pressure is sensed. In this position of the pointer, both the inlet and outlet sections, are closed. (In a mercury contact pressure gage a certain contact is closed under this condition.)

When a programmed pressure change is desired, the opposing voltage is changed in steps at the electric compensator, e.g., by means of an electric motor for changing the value of a resistor in steps. The controller provided with a measuring system then operates the inlet or outlet valves to adjust the pressure to the new value. The stepping may be effected by a pulse transmitted by a timer 12.

The automatic control system which has been diagrammatically shown may be supplied, e.g., with nitrogen from a bomb 1 at a reduced pressure of 2 kg./sq. cm. In the inlet section, two parallel valve pairs consisting each of a solenoid valve 3 and a needle-type throttle valve 4 are used to reduce the pressure to the level which is required for the supply to the receiver. The outlet section comprises the needle valve 8, which is controlled by the servomotor 9, and a solenoid valve 10. The controller 7 operates the valves 9 and 10 in response to the preset measuring means 6 to control the amount of gas which is drawn from the receiver by a two-stage rotary sliding vane pump 11. The measuring means may consist of a mercury pressure gage having an electrical output and a motor-controlled pressure-setting stepping mechanism having tens and units shafts and serving for switching or resistor sections controlling the capacity of the pump. If a programmed change of pressure is desired, the pulse transmitter for adjusting the stepping mechanism consists of a timer 12, which transmits pulses having a duration of one second in intervals of fifteen minutes. The electric controller 7 consists of a light beam galvanometer having three adjustable porotodetectors for a control of three relays. Two of said relays control the inlet solenoid valves 3 and one relay controls the outlet solenoid valve 10 and the motor-controlled needle valve 8.

The needle valve 8 is opened slowly by the servomotor 9 running at a constant speed. When the desired pressure has been reached, the solenoid valve 10 is closed instantaneously and the needle valve 8 is closed too.

When the pressure in the receiver 5 drops below the desired pressure which has been electrically set by the pressure-setting stepping mechanism, the solenoid valve 3 for the lower flow rate is opened. In the case of a large deviation, the solenoid valve for the higher flow rate is also opened, until the desired pressure has been reached. When a higher pressure is reached, the outlet solenoid valve 10 and the needle valve 8 are opened at the same time.

The reaction gas may be any gas which can be used as an inert gas, specifically nitrogen. The automatic control system according to the invention can be used in a pressure range between a vacuum and approximately 150 kg./sq. cm.

The system has a sensitivity of $10^{-2}$ millimeters mercury. The program-controlled range with one hundred pressure-changing steps covers the pressure from $10^{-2}$ to 760 millimeters mercury.

The consumption of reaction gas is extremely small compared to the known automatic control systems.

What is claimed is:

1. Apparatus for an automatic control of a gas pressure, which comprises,
    a source of gas under high pressure,
    a receiver,
    a gas-withdrawing means,
    an inlet section connecting said high pressure source to said receiver,
    an outlet section connecting said gas-withdrawing means to said receiver,
    said inlet section comprising a solenoid valve and in series therewith a throttle valve,
    said outlet section comprising a solenoid valve and in series therewith a variable-area throttle valve,
    a motor energizable to adjust the area of said variable-area throttle valve,
    a measuring means for producing an electric output signal in response to the gas pressure in said receiver, and
    an electric controller connected to said measuring means and arranged to control the energization of said solenoid valves and said motor in response to said output signal.

2. An apparatus as set forth in claim 1, in which a pressure-reducing valve is connected between said source of gas under high pressure and said inlet section.

3. Apparatus as set forth in claim 1, in which said gas-withdrawing means comprises a vacuum pump.

4. Apparatus as set forth in claim 1, in which said measuring means comprises a contract pressure gage.

5. Apparatus as set forth in claim 1, which comprises
    a pressure-setting stepping means for setting the capacity of said measuring means, and
    a program control device for transmitting pulses to said stepping means to initiate pressure-changing steps thereof.

6. Apparatus as set forth in claim 1, in which
    said inlet section comprises at least two parallel flow paths connected to said receiver,
    each of said flow paths comprises a solenoid valve and in series therewith a throttle valve, and
    said controller is arranged to control selectively the energization of said solenoid valves in response to said output signal.

7. Apparatus as set forth in claim 1 and comprising means responsive to a predetermined program for actuating said measuring means and controller to vary the pressure in said receiver.

References Cited

UNITED STATES PATENTS

| 2,709,340 | 5/1955 | Webber | 62—473 X |
| 2,851,864 | 9/1958 | Webber | 62—217 X |
| 3,279,214 | 10/1966 | Klipping | 62—52 X |
| 3,307,370 | 3/1967 | Klipping | 62—514 X |
| 3,416,547 | 12/1968 | Glenn | 137—12 |
| 3,429,336 | 2/1969 | Moriyama | 137—487.5 |

WILLIAM F. O'DEA, Primary Examiner

W. H. WRIGHT, Assistant Examiner

U.S. Cl. X.R.

137—8, 12, 14, 488